WAVE TRANSMISSION AMPLIFIER

Filed June 18, 1949 2 SHEETS—SHEET 1

INVENTORS C. C. CUTLER
W. E. MATHEWS
BY N. S. Ewing
ATTORNEY

WAVE TRANSMISSION AMPLIFIER

Filed June 18, 1949 2 SHEETS—SHEET 2

INVENTORS C. C. CUTLER
W. E. MATHEWS
BY N. S. Ewing
ATTORNEY

Patented Aug. 26, 1952

2,608,623

UNITED STATES PATENT OFFICE 2,608,623

WAVE TRANSMISSION AMPLIFIER

Cassius C. Cutler, Gillette, and Warren E. Mathews, Chatham, N. J., assignors to Bell Telephone Laboratories, Incorporated, New York, N. Y., a corporation of New York Application June 18, 1949, Serial No. 99,912

15 Claims. (Cl. 179—171)

This invention relates to wave transmission and more particularly to a novel means and method of amplifying a transmitted wave of energy.

In the observation and measurement of various types of oscillation, for example, the vibration measured in seismographic observations or the low frequency sound waves recorded in cardiographich observations, it is often necessary to substantially amplify the desired energy oscillations before they may be observed or recorded. In such a case, it has been the practice to transform these oscillations into electrical impulses which impulses are then amplified by means of thermionic amplifier circuits. Great difficulty has been experienced in the design of a thermionic amplifier suitable for broad band amplification of the low frequencies encountered in these oscillations.

It is therefore an object of the invention to amplify sound waves, or other vibrations, directly without conversion to electrical impulses.

Another object of the invention is to produce gain in a low frequency electrical signal of broad band width without the use of thermionic amplifier tubes and the inherent band width limitations of the circuits used therewith.

It is a further object of the invention to amplify pressure or vibration waves in a hydraulic or mechanical transmission system.

It is a feature of the invention by which the above-mentioned objects are accomplished to transform energy of uniform mechanical motion to energy of oscillation in a transmitted wave.

In accordance with the objects of the invention an input signal to be amplified constituting electrical waves, mechanical vibrations, or hydraulic waves are impressed on a transmission medium coupled for mutual wave energy exchange to a second transmission medium moving relative to the first medium at a velocity related to the propagation velocities of wave transmission in the respective transmission media. The wave energy is amplified by a transformation of kinetic energy of uniform motion to energy of oscillation in the respective waves.

In a first embodiment of the invention electrical energy is amplified by the interaction of two coupled electrical transmission lines in relative motion. In a second embodiment of the invention mechanical vibrations are amplified by the interaction of two mechanical transmission systems in relative motion. In another embodiment of the invention hydraulic waves, either longitudinal or transversal, are amplified by means of relative motion between two coupled hydraulic transmission systems.

The nature of the present invention, its various objects, features and advantages will appear more fully upon consideration of the various embodiments illustrated in the accompanying drawings and the following detailed description thereof.

Figures 4, 5A, 5B, 5C, 6:
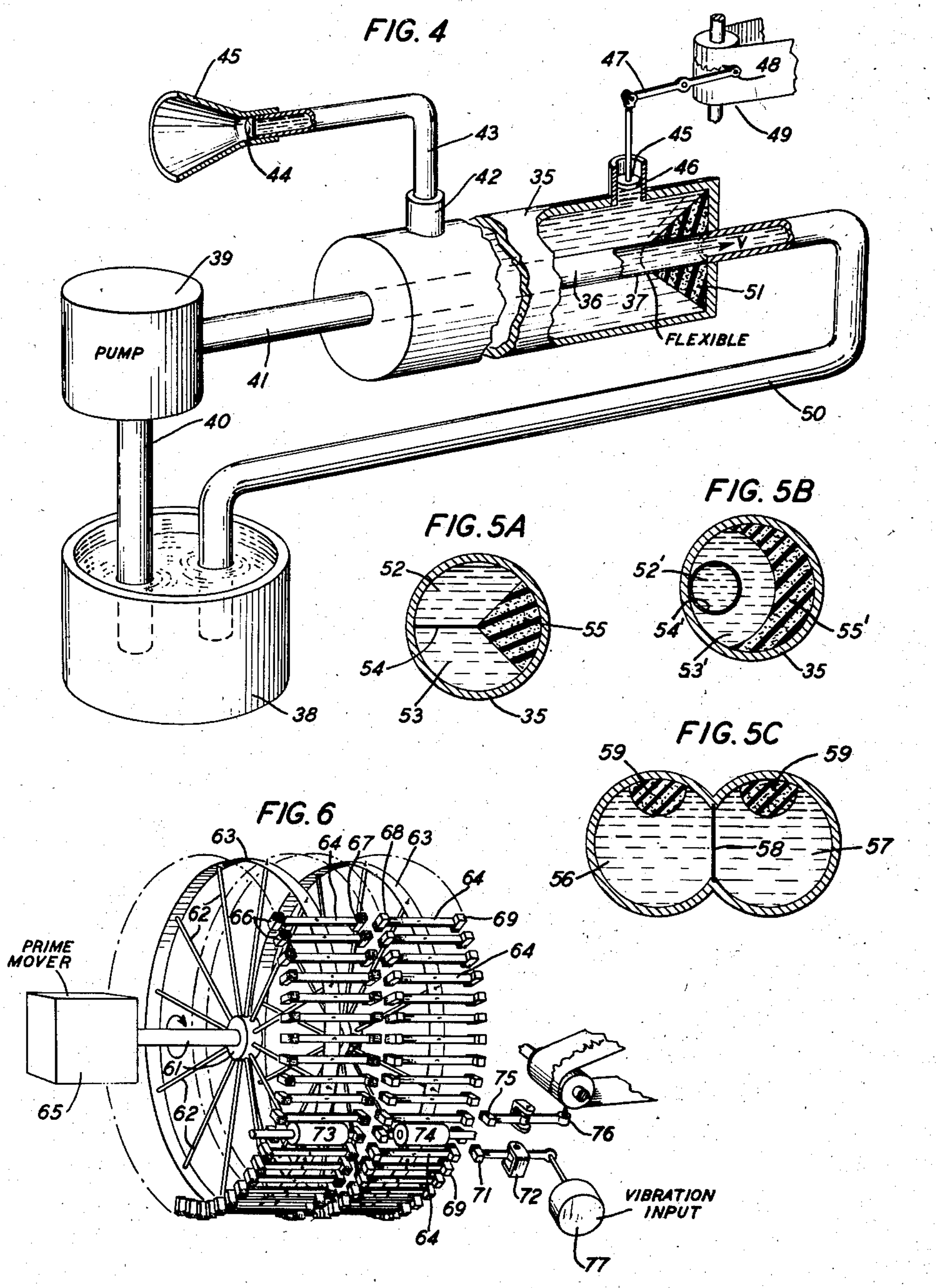
Fig. 4 illustrates by way of example a hydraulic amplifier in accordance with an embodiment of the invention.

Figs. 5A, 5B, and 5C show three alternative cross-sectional arrangements of a hydraulic amplifier as represented by Fig. 4; and Fig. 6 illustrates by way of example a mechanical amplifier in accordance with an embodiment of the invention.

In order to fully understand the principles of the invention, it is necessary to understand a few basic principles of wave motion. In order, therefore, to provide a firm foundation from which to proceed to the specific embodiments to be hereinafter described, a few general comments with regard to wave motion are deemed worthwhile.

When a disturbance is introduced into a physical medium such as a liquid, it is well known that the disturbance will spread or propagate through the medium. The medium does not move as a whole, but some particular configuration of its particles does, while the particles themselves oscillate over very short paths. Most waves can be classified as either longitudinal or transverse. A longitudinal wave is one in which the vibrating particles move forward and backward parallel to the direction in which the wave is propagated. In a transverse wave, the particles vibrate at right angles to the direction of propagation. Electromagnetic waves of all types are transverse waves and are transmitted by changes in the magnetic and electrical fields of the waves which correspond to the particles in other transmission medium.

Thus, the progress of any wave involves two distinct motions. The wave itself moves forward with constant speed, which means that the configuration advances equal amounts in equal periods of time. Meanwhile the particles of the medium that convey the wave vibrate in harmonic fashion. The velocity at which the wave progresses through the medium, known as the velocity of propagation, depends upon the speed at which these particles can change their position, which in turn depends upon inertia and stiffness of the medium. This velocity is determined completely by the properties of the transmission medium and does not depend upon either the frequency or the wavelength of the waves. Thus, the velocity of propagation of a wave in any medium may be expressed $$V=\frac{1}{\sqrt{\text{measure of inertia}\times\text{measure of stiffness}}}$$

wherein measure means the amount of inertia or stiffness of the medium per unit length in the direction of propagation. In a mechanical system, the velocity of propagation is controlled by varying the mass and compliance of the elements of the medium which are the mechanical parameters determining the measure of inertia and measure of stiffness, respectively. In a hydraulic system the velocity of propagation is controlled by varying the density and compressability of the gas or liquid media which are the hydraulic parameters determining the measure of inertia and measure of stiffness, respectively.

For electromagnetic waves the speed of propagation is determined by the speed at which the associated electric and magnetic fields may change. When the waves are propagated through the atmosphere or through a low dielectric medium, the fields may change very rapidly and the velocity of propagation approaches that of the speed of light. However, when the electromagnetic waves are propagated through a medium having an effective distribution of inductance and capacitance, which are the respective electrical parameters determining the measure of inertia and measure of stiffness, the rate of the successive decay and building up of the fields is decreased. This is the action of the familiar electrical delay transmission line or a simple low pass filter network. Assuming that the reactive components of the line are very large compared to the resistive components of the line, the velocity of propagation in meters per second of an electromagnetic wave along an inductive and capacitive transmission line may be expressed $$V=\frac{1}{\sqrt{LC}}$$

in which L is the inductance per unit length of the line in henries per meter and C is the capacitance per unit length of the line in farads per meter. A complete derivation of this expression may be found in Southworth, "Principles and Applications of Wave Guide Transmission," D. Van Nostrand, 1950, pages 39 through 44, or in Shelkunoff, "Electromagnetic Waves," D. Van Nostrand, 1943, pages 188 through 196. It is thus seen that the velocity of propagation of electromagnetic waves through a transmission medium may be made as slow as desired by choosing the appropriate inductance and capacitance of the elements composing the medium.

Having thus reviewed the basic principles of wave propagation, method and means for producing signal energy amplification in related propagation media will now be disclosed. In accordance with the invention, the signal energy to be amplified is impressed upon a first energy propagating medium for transmission therein in a forward direction. A portion of this energy is transferred to a second energy propagating medium to induce in the second medium a corresponding signal wave that is transmitted therein in a backward direction. The two media are moved relative to each other at a constant velocity. The effective measure of inertia and measure of stiffness of each of the media are chosen to provide a velocity of propagation for the energy in each of the media which is less than the relative velocity of motion between the media so that the forward wave and the backward wave move together at the same velocity relative to the first medium. It will be seen that this requires a relative motion equal to the sum of the propagation velocities in each of the media. The signal energy so amplified is removed from one of the media.

Figure 1:
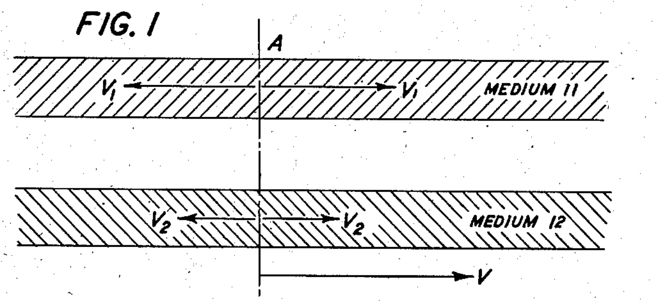
Fig. 1 shows by way of illustration the basic elements and their physical relationships in accordance with the theory underlying the invention.

Referring now to Fig. 1, two parallel linear wave energy propagating media are shown, wherein 11 represents a medium capable of independently propagating waves either forward, i. e. to the right, or backward, i. e. to the left, at a first velocity $V_1$, and 12 represents a medium capable of independently propagating waves either forward or backward with respect to the medium at a second velocity $V_2$. Medium 11 is considered to be stationary and medium 12 is assumed to have a velocity V in the forward direction. However, it is understood that V represents solely the relative velocity between the respective media so that either one or both of the latter may be moving. Both propagating media may be of any type suitable for supporting and propagating wave energy. For example, they may be fluid streams capable of propagating hydraulic waves, electrical transmission lines capable of propagating electromagnetic waves, or mechanical transmission systems capable of propagating vibration waves.

Since the backward wave in medium 12 is propagated at a particular velocity in the backward direction with respect to the medium, and since the medium itself is moved in a forward direction at a velocity V, it is evident that if the velocity of motion is greater than the velocity of propagation, the backward wave in medium 12 will appear to move in a forward direction with respect to fixed medium 11. This apparent motion will be termed the resultant velocity of the backward wave in medium 12. Further, if the velocity of motion V of medim 12 is approximately equal to $V_1+V_2$, the resultant velocity of the backward wave in medium 12 will be equal to the velocity of the forward wave in medium 11.

If the media 11 and 12 are now related by coupling means, uniformly distributed along the length of the lines for mutual wave energy transfer between the two media, the coupled system is capable of supporting any or all of four waves corresponding approximately to the natural waves in the absence of coupling. The energy of each of the waves present divides in some characteristic ratio between the two media. Due to the coupling, however, the propagation behavior of these possible waves is somewhat different from the propagation behavior of the corresponding possible independent waves in the absence of coupling. In particular, when V is approximately equal to $V_1+V_2$, or when the relative velocity of motion between the two coupled transmission media is equal to the sum of the independent propagation velocities, an unusual phenomenon has been found to exist in the coupled transmission media.

Under this condition, it has been found that one of the possible forward waves of the coupled system has an amplitude changing exponentially with distance and increasing in the forward direction providing amplification.

It has further been found that if an input signal is introduced at any point A along the system, this energy will divide between the systems and propagate away from the driving point by means of some or all of the four possible waves. At a sufficient distance, which in all practical applications will amount to at least several wavelengths of the input signal in the forward direction from the driving point, however, the increasing wave will predominate over all others in the system and also will have an amplitude greater than that of the input signal. Thus a device of such length will serve as an amplifier of wave energy. The amount of this amplification as related to the velocities and coupling will be shown in detail later.

Figure 2:
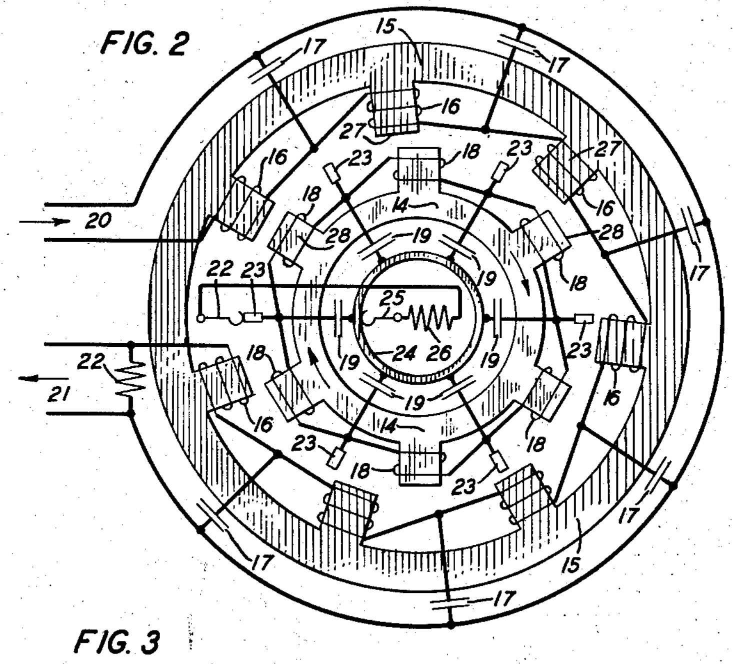
Fig. 2 shows an electrical wave amplifier.

Fig. 2 shows an electrical wave amplifier in which the foregoing principles of operation are utilized. A rotor core 14 is mounted for rotational motion within the stator core 15. The structure and relation of these core pieces may be similar to that employed for the common induction motor or other rotating electrical machine in which the stator and rotor are provided with pole-pieces 27 and 28 on which turns of wire may be placed. On the pole-pieces 27 of the stator are placed turns of wire which make up a plurality of inductive elements 16 connected in series. Capacitive elements 17 are connected between each of the inductive elements 16 and a common point. This results in an electrical delay line having a velocity of propagation determined by the value of the inductive and capacitive elements 16 and 17, respectively. A signal wave impressed upon the delay line by means of input terminals 20 connected to one of the inductive elements 16 and the common connection of capacitive elements 17 will travel around the delay line and may be taken from the delay line by means of output terminals 21 connected between the last of the series inductive elements 16 and the common connection. An impedance element 22 is provided across the output terminals 21 for matching the characteristic impedance of the stator delay line to the connected output system to prevent reflections back along the stator delay line from terminals 21 to input terminals 20.

A similar electrical delay line is placed on the rotor comprising inductive elements 18 wound on pole-pieces 28 of rotor core 14 and connected in series to form a closed loop, rather than open and terminated as the stator delay line is, and capacitive elements 19 which are connected between a common point and the connection point between each of the inductive elements 18. This provides a second delay line having a velocity of propagation determined by the value of inductance and capacitance of elements 18 and 19, respectively.

A commutator of standard construction and a slip ring 24 also of standard construction are arranged to rotate with the rotor in the usual manner. The commutator segments 23 are each connected to the point of connection of adjacent inductive elements 18 and capacitive elements 19 of the rotor delay line. Slip ring 24 is connected to the common connections of capacitive elements 19.

The core structures 14 and 15 may be constructed of magnetic material, which would naturally increase the effective inductance of inductive elements 16 and 18, or these structures may be constructed of non-magnetic or dielectric material which provides a rigid support for the inductive and capacitive elements without affecting the value thereof.

The rotor 14 is driven to rotate at a constant velocity in the direction of propagation from input connection 20 to output connection 21, or as shown on Fig. 2, in a clockwise direction by a prime mover of any type. At a point slightly in advance of input connection 20 with respect to this rotation, a brush 22 is located. Brush 22 makes successive contact with each of the commutator segments 23 as the rotor rotates. Slide contact 25 and resistor 26 are connected between slip ring 24 and brush 22. This slip ring-brush resistor combination discharges each section of the rotor delay line as it passes the position of brush 22 so that at the time the shorted section passes a point adjacent input connection 20 it will contain substantially no signal energy. The purpose of this circuit will later become apparent.

Figure 3:
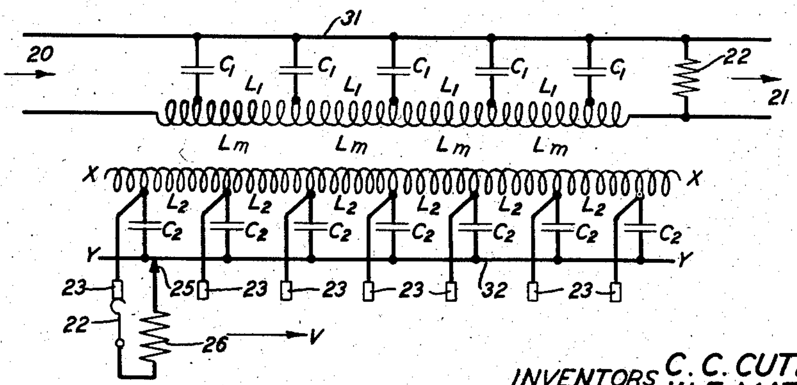
Fig. 3 shows by way of explanation the transmission line equivalent of the system of Fig. 2.

The operation of the electrical wave amplifier of Fig. 2 may more readily be analyzed with reference to Fig. 3, wherein the stator delay line is represented by line 31 and the rotor delay line by line 32 with the discharging connections 22, 25 and 26 in the proper relative position. The rotational velocity of the rotor is indicated by a relative velocity V between lines 31 and 32.

In Fig. 3, $L_1$ and $C_1$ are the series inductance and shunt capacitance per unit length of line 31, either uniformly distributed or distributed in discrete sections short compared to the wavelength at the operating frequency. $L_2$ and $C_2$ are the corresponding elements of line 32 and the two lines are coupled by means of a mutual inductance $L_m$ per unit length.

The uncoupled wave propagation velocities of the two lines are given by the relations defined above where $$V_1=\frac{1}{\sqrt{L_1C_1}} \tag{1}$$

the propagation velocity of line 31, $$V_2=\frac{1}{\sqrt{L_2C_2}} \tag{2}$$

the propagation velocity of line 32, and the coupling parameter $\mu$ is defined as $$\mu=\frac{L_m^2}{L_1L_2} \tag{3}$$

The coupling between the systems might well be capacitive rather than inductive as indicated.

The behavior of the coupled system at any point along the lines may be described by the equations $$L_1i_{01}+L_mi_{02}=\frac{\beta_1}{\omega_1}e_{01} \tag{4}$$

$$L_2i_{02}+L_mi_{01}=\frac{\beta_2}{\omega_2}e_{02} \tag{5}$$

$$C_1e_{01}=\frac{\beta_1}{\omega_1}i_{01} \tag{6}$$

and $$C_2e_{02}=\frac{\beta_2}{\omega_2}i_{02} \tag{7}$$

where the instantaneous line currents $i_1$ in line 31 and $i_2$ in line 32 and respectively corresponding instantaneous line voltages $e_1$ and $e_2$ have been assumed to be of the form $$i_1=i_{01}e^{j\omega_1 t-j\beta_1 Z_1} \quad (8)$$

$$e_1=e_{01}e^{j\omega_1 t-j\beta_1 Z_1} \quad (9)$$

$$i_2=i_{02}e^{j\omega_2 t-j\beta_2 Z_2} \quad (10)$$

and $$e_2=e_{02}e^{j\omega_2 t-j\beta_2 Z_2} \quad (11)$$

Here Z represents distance in the forward direction of propagation, $Z_1$ being measured with respect to a fixed origin and $Z_2$ being measured in a frame of reference moving with velocity V. The parameters $\omega_1$ and $\beta_1$ represent the angular frequency and propagation constant, respectively, of a wave on line 31. The parameters $\omega_2$ and $\beta_2$ represent the corresponding quantities for line 32, with the point of reference moving with line 32.

Since any one propagation mode must have the same time and space variations in any one frame of reference, it follows that $$\beta_2=\beta_1=\beta \quad (12)$$

and $$\omega_2=\omega_1-\beta_1 V=\omega-\beta V \quad (13)$$

Simultaneous solution of Equations 4 through 7, taking account of Equations 1 through 3 and making use of Equation 13 to eliminate the moving frame of reference, yields $$V_1^2(V_2^2-V^2)\left(\frac{\beta}{\omega}\right)^4+2VV_1^2\left(\frac{\beta}{\omega}\right)^3-(V_1^2+V_2^2-V^2[1-\mu])\left(\frac{\beta}{\omega}\right)^2-2V(1-\mu)\left(\frac{\beta}{\omega}\right)+(1-\mu)=0 \quad (14)$$

Equation 14 is equally valid when the coupling between the lines is capacitive, in which case $$\mu=\frac{C_m^2}{C_1C_2}$$

where $C_m$ is the mutual capacitance per unit length.

Equation 14 may be written in the form $$F(\beta)+\mu G(\beta)=0 \quad (15)$$

where $$F(\beta)=\left(\frac{V_1^2}{\omega^2}\beta^2-1\right)\left(\left[1-\frac{V}{\omega}\beta\right]^2-\frac{V_2^2}{\omega^2}\beta^2\right) \quad (16)$$

$$G(\beta)\left(1-\frac{V}{\omega}\beta\right) \quad (17)$$

If $\mu$ is small, the roots of Equation 15 will differ only slightly from the roots of $F(\beta)=0$, which obviously are the resultant uncoupled mode propagation constants. Setting $$\beta=\frac{\omega}{V-V_2}+\frac{\omega}{V_1}m \quad (18)$$

and expanding (15) in a Taylor series, there results $$m^2\left(V_1+\mu\frac{V^2}{4V_2}\right)-m\left(\delta-\mu\frac{V}{2}\right)+\mu\frac{V_2}{4}=0 \quad (19)$$

where $$\delta=V-(V_1+V_2) \text{ and } |\delta|\ll V_1 \quad (20)$$

and higher order terms in $m$ have been neglected. The parameter $\delta$ is a measure of the deviation from equality between the natural forward wave velocity of line 31 and the resultant natural backward wave velocity of line 32. Solution of Equation 19 for $m$ and substitution into Equation 18 yields, with the aid of Equation 20, $$\beta_1=\frac{\omega}{V_1^2}\left(V_1-\frac{\delta}{2}-\mu\frac{V}{4}+\frac{1}{2}\sqrt{\delta^2-\delta\mu V-\mu V_1V_2}\right) \quad (21)$$

$$\beta_2=\frac{\omega}{V_1^2}\left(V_1-\frac{\delta}{2}-\mu\frac{V}{4}-\frac{1}{2}\sqrt{\delta^2-\delta\mu V-\mu V_1V_2}\right) \quad (22)$$

These two values of the propagation constant $\beta$ characterize two of the possible waves of the coupled system when $(V-V_2)$ is approximately equal to $V_1$. When $\delta=0$, or is sufficiently small that $\delta^2-\delta\mu V-\mu V_1V_2<0$, then $\beta_1$ and $\beta_2$ are complex, characterizing respectively the increasing wave mentioned previously and a decreasing wave.

In this case, the rate of increase of the increasing wave corresponding to $\beta_1$, after propagation along a path length equal to one wavelength of the signal being amplified, is given by $$A=\eta\sqrt{(V-V_1-V_2)^2-\mu V(V-V_1-V_2)-\mu V_1V_2}\ \frac{\text{nepers}}{\text{wavelength}} \quad (23)$$

Unless $V_2$ is very small compared with $V_1$, the term $\delta\mu V$ in Equation 21 and Equation 22 is negligible for most practical computations. Thus the limiting values of V for amplification are given approximately by $$V_{1\text{im}}=V_1+V_2\pm\sqrt{\mu V_1V_2} \quad (24)$$

and the maximum rate of increase of the increasing wave, obtained when $V=V_1+V_2$, is given approximately by $$A_{\text{max.}}=\pi\sqrt{\mu\frac{V_2}{V_1}}\ \frac{\text{nepers}}{\text{wavelength}}=27.3\sqrt{\mu\frac{V_2}{V_1}}\ \frac{\text{decibels}}{\text{wavelength}} \quad (25)$$

In a particular embodiment in accordance with the invention designed to amplify an electrical signal wave having a mid-band frequency of 200 cycles per second, rotor 14 is given an outside diameter of 15.9 centimeters which, except for clearance therebetween, is substantially the same as the inside diameter of stator 15. Rotor 14 is driven at a speed of 3600 revolutions per minute and stator 15 is stationary. A point on the periphery of rotor 14 thus moves at a velocity V of 2000 centimeters per second. The propagation velocities $V_1$ and $V_2$ of the signal waves on the stator line 31 and rotor line 32, respectively, are equal and are, therefore, equal to 1000 centimeters per second or 10 meters per second. In accordance with Equations 1 and 2 above, the product of LC necessary to give this propagation velocity for $V_1$ and $V_2$ is 0.01 henry-farad per square meter. A transmission line impedance of 1000 ohms is obtained by proportioning the inductance and capacitance as 100 henries per meter and 100 microfarads per meter, respectively. Since the outside circumference of rotor 14 is 50 centimeters of 10 wavelengths, 50 inductive elements 18, each having an inductance of 1 henry, and 50 capacitive elements 19, each having a capacitance of 1 microfarad, are employed, all equally spaced 1 centimeter or 0.2 wavelength apart. The same number and size inductive elements 16 and capacitive elements 17 are located at the same interval around stator 15.

Thus the electrical wave amplifier of Fig. 2 provides gain per unit length around its circumference. The signal introduced by line 20 is mutually propagated by the stator and rotor transmission lines 31 and 32 around the circumference of the system at a velocity of 1000 centimeters per second. This mutual propagation amplifies the signal when the rotational velocity of the rotor 14 with respect to the stator 15 is equal to approximately 2000 centimeters per second, the sum of the propagation velocity of the signal around the stator in the absence of coupling and the velocity of the signal around the rotor in the absence of coupling. The amplified signal is taken off by transmission line 21. The slip ring-brush resistor combination 23, 22 and 25 dissipates the energy on the rotor delay line 32 at the end of one revolution by short-circuiting this line through resistance 26 having an impedance of 1000 ohms at a point opposite or in advance of the transmission line 20, thus preventing feedback of the amplified wave energy to the input of the device. The dissipated energy may be used if desired as a second output by connecting the desired load across resistance 26.

Referring now to Fig. 4, a hydraulic amplifier is illustrated comprising a substantially inflexible outer cylindrical container 35 and an inner container 36 extending therethrough. The inner container is provided with a flexible wall 37 which wall extends along the portion of tube 36 included within cylinder 35. The system is filled with fluid. Both containers 35 and 36 may contain the same fluid or they may contain fluids having different wave propagation velocities. The fluid in the inner container 36 is forced from tank 38 by a high velocity pump 39 through connecting tubes 40 and 41. The fluid in cylinder 35 may be stationary and is connected through branching pipe 42 and tube 43 to a diaphragm 44. For example, diaphragm 44 may be a portion of the pick-up 45 of a seismograph or stethoscope, or the output of an electrical reproducing mechanism or other mechanical or hydraulic device. Vibrations thus picked up by diaphragm 44 are transmitted by means of the fluid contained in tube 43 and connection 42 to the liquid contained in cylinder 35.

As pointed out hereinbefore the fluid in the inner pipe 36 is forced through the system with the velocity V equal to the sum of the respective natural propagation velocities of the fluids in cylinder 35 and cylinder 36, thus producing maximum amplification in the direction of motion of the inner stream. The value of this amplification is expressed by Equation 25 where $\mu$ is the coupling between the streams provided by the membranous wall 37 and $V_1$ and $V_2$ are the natural propagating velocities of the outer stream and inner stream respectively. The mechanical vibration applied through connection 42 to the fluid in cylinder 35 will be amplified over the length of the mutual propagation path and transmitted from the amplifier by means of piston 45 located in connection 46 and making contact with the fluid in cylinder 35, and the linkage mechanism 47, to a vibration utilizing mechanism 48. Mechanism 48 is shown by way of illustration as the stylus of a vibration recording device 49. Signal energy remaining in the inner stream will pass out through pipe 50 and will be dissipated in reservoir 38 or, as in the case of the electrical system, this dissipated energy may be used as a second output.

In order to prevent undue reflections within the fluid, reflection absorber 51 is placed in the output end of cylinder 35 to absorb vibrations. Absorber 51 may be a wedge of dissipating material such as soft felt or rubber which can readily absorb vibrations. Without this reflection absorber it is readily apparent that the amplifier would become self-oscillatory.

However, should it be desired to generate oscillations, absorbing material 51 as well as reservoir 38 may be eliminated and pipes 40 and 50 connected directly together. Thus all vibrations would be retransmitted to the input thus providing positive feedback and self-sustained oscillations. Oscillatory energy may be taken off from either connection 46 or connection 42.

The hydraulic waves thus far considered in Fig. 2 are well known in the art as compressional or longitudinal waves. The propagation velocity of such waves depends on the elasticity and density of the medium; the greater the elasticity or the smaller the density, the greater will be the propagation velocity. Therefore, substances such as water will have a much greater propagation velocity than substances such as mercury or oil. For this reason, the fluids contained in cylinders 35 and 36 may be chosen to have a low velocity of propagation and therefore substantially decrease the velocity of flow that is required to obtain maximum amplification.

Fluids also may transmit transverse or surface waves in which the particles of the medium move at right angles to the direction in which the wave is propagated. In general, transverse waves are propagated at a much smaller velocity in a given substance than the longitudinal waves. The velocity of the former depends to a large extent on the restoring force on the wave, i. e., the weight of the fluid and its surface tension in an open container. The smaller the restoring force or the greater the effective compressibility of the fluid medium the smaller is the velocity of propagation.

The cross-sectional views of Figs. 5A through 5C represent alternative arrangements of the two streams as described with relation to Fig. 4, wherein the slower moving or transverse wave is utilized by the inclusion of a resilient or highly compressible medium to increase the effective compressibility of the fluid media.

In Fig. 5A, cylinder 35 is shown as divided into three cross-sectional segments. The media contained in segments 52 and 53 are separated by the membranous wall 54 and either or both may be moving to provide the proper relative velocity. Segment 55 may be filled with air, vacuum, or any other resilient medium to provide the desired restoring force. In Fig. 5B the cylinders containing the propagating media 52′ and 53′ are arranged one within the other and the resilient medium 55′ may be concentric thereabout or eccentric as shown. In Fig. 5C the two streams 56 and 57 are indicated as being laterally contiguous with a separate restoring medium 59 for each stream. The arrangements thus shown are merely suggestive of possible configurations and numerous others will serve equally well. For example, the two streams may be simply open troughs which are coupled through a common flexible boundary.

Fig. 6 shows an amplifier for the amplification of mechanical vibrations comprising two identical mechanical wave transmission systems capable of relative motion therebetween and coupled magnetically for mutual wave energy exchange.

Each transmission system comprises a wheel 61 having radiating spokes 62. Around the ends of spokes 62 is placed a hoop of flexible spring material 63 supported and held in place by the spokes 62 but not rigidly connected thereto. This connection is such as to restrain the hoop 63 in a direction tangential to the hoop circumference so that the rotational motion of the wheel 61 and the spokes 62 will be imparted to the hoop 63. This connection, however, must allow the spring hoop 63 to be free to twist or to be free for partial rotation of a segment thereof about the tangential axis. Around the periphery of the hoop are located bars 64, relatively massive with respect to the mass of the spring material of hoop 63. Bars 64 are mounted rigidly to hoop 63 at equally spaced intervals and extend transversely on either side of the hoop perpendicularly to the tangential axis. Any disturbance introduced upon one of the massive bars 64 tending to rotate the bar about the tangential axis and thus to twist the portion of the hoop 63 immediately adjacent thereto, will be transmitted from bar to bar around the system by the torsional action of the interconnecting spring 63 at a velocity of propagation depending upon the mass of the bars and the compliance of the spring material.

The two systems are axially mounted and either or both are capable of rotational motion. A prime mover 65 is shown for rotating the system on the left at a constant angular velocity.

At the ends of the bars 64 are mounted radially oriented permanent magnets 66 and 67 on the bars of the first system, and magnets 68 and 69 on the second system. Magnets 66 and 67 are polarized in one direction and 68 and 69 in the opposite direction so that the strongest possible coupling force may be obtained between the closely spaced magnets 67 and 68 between the two systems. A wave introduced on one of the systems will therefore be coupled through the magnets to the other system.

Numerous means for introducing an initial disturbance may be devised depending on the system to be connected. One possible means is shown in Fig. 6 wherein a magnet 71 is mounted on support 72 in close proximity to the magnets 69. Any movement of 71 coupled thereto by a linkage mechanism from a vibration input source 77 will therefore be imparted by magnetic attraction or repulsion to the magnet opposite it which will take up like motion. This motion will be imparted to the next bar 64 by means of the connecting spring member 63 and thus to the following bar and successively around the perimeter of the spring until the wave motion reaches damping wheels 73 and 74. Damping members 73 and 74 are placed to roll upon the surfaces of bars 64 at a point in advance, with respect to the direction of rotation, of the bars 64 coupled magnetically to input magnet 71. Damping members 73 and 74 may be constructed of felt or rubber or any like material which will readily absorb the energy of motion from the bar which at that instant is making contact with it. It is pointed out that damping wheel 73 serves a function analogous to the container 38 in Fig. 4 of the hydraulic system or the shorting resistance 26 in Fig. 2 of the electrical system, while damping wheel 74 is analogous to the absorber 51 in Fig. 4.

At a point preceding damping wheels 73 and 74 with respect to the direction of rotation, a means for abstracting the signal wave is provided for either or both of the systems. This means is indicated in Fig. 6 as a magnet 75 arranged in the same manner as input magnet 71. The motion of the bar opposite 75 is imparted thereto by the magnetic coupling of 69 to 75. An output mechanism 76 is shown connected to magnet 75 similar to the output mechanism 48 of Fig. 4.

If one or both of the transmission systems are turned so that there is a constant relative motion between them equal to the sum of their natural propagating velocities, amplification will result from the wave interaction between the systems around the perimeter of the wheels. A small disturbance or signal vibration introduced by 71 will be amplified and taken from the system by 75.

It is readily apparent that the input signal energy may be impressed on either of the systems and that the output signal may be taken from either or both of the systems. Likewise, it is apparent that either system may move or that both may move in such a manner in either case that substantially the desired relative velocity between the systems is preserved.

As in the case of the hydraulic and electrical systems, various means of coupling between the mechanical systems may be employed. For example, a system of rollers and springs might be used rather than the system of magnets as shown.

It is to be understood that the above arrangements are illustrative in the specific embodiments thereof of the principles of the invention. Numerous other arrangements may be devised by those skilled in the art without departing from the spirit and scope of the invention.

What is claimed is:

1. In combination, a pair of guided wave transmission systems in distributed intercoupling relation to each other, driving means to move one of said systems continuously relative to the other at a constant relative velocity, input means to excite a signal wave in one of said systems for transmission therein in the direction of relative motion of the other of said systems, means inducing in said other system a corresponding signal wave that is transmitted therein in a direction opposite to said direction of relative motion, each of said wave transmission systems having a wave propagation velocity for the signal wave therein the sum of which propagation velocities equals said constant relative velocity, whereby both said excited wave and said induced wave are transmitted in the same direction with substantially the same velocity relative to said first system, and output means coupled to at least one of said systems for abstracting the resultant amplified signal wave.

2. The combination in accordance with claim 1, wherein each of said pair of guided wave transmission systems is a two-conductor electrical delay transmission line and wherein said intercoupling is reactively provided between said lines along a portion of their length.

3. The combination in accordance with claim 1, wherein each of said pair of guided wave transmission systems is a hydraulic medium and including a membranous wall separating said media to provide said intercoupling.

4. The combination in accordance with claim 1, wherein each of said pair of guided wave transmission systems is a fluid medium and including means for increasing the effective compressibility of said media.

5. The combination in accordance with claim 1, wherein each of said pair of guided wave transmission systems is a mechanical vibration transmission means and wherein said intercoupling is magnetically provided between said systems.

6. A wave amplifying system comprising a first wave energy propagating medium, signal input means for exciting a wave of energy in said medium to be propagated therein in a first direction, a second wave energy propagating medium, wave energy transmission means coupling said first and second media for mutual wave energy exchange therebetween along an effective length for said wave energy of several wavelengths in said propagation direction, means for producing motion of one of said media relative to the other of said media at a constant velocity therebetween, said first wave propagating medium having a wave energy propagation velocity less than said constant velocity, said second medium having a velocity of propagation for the wave energy therein substantially equal to the difference between said constant velocity and said propagation velocity of said first wave energy propagating medium.

7. An amplifying system in accordance with claim 6 for electrical waves, wherein said first and second propagating media each comprise a two-conductor electrical delay transmission line and wherein said wave energy transmission means comprises reactive coupling between said lines.

8. An amplifying system in accordance with claim 6 for electrical waves, wherein said first and second propagating media each comprise a two-conductor electrical delay transmission line of inductive and capacitive elements and wherein said wave energy transmission means comprises inductive coupling between the inductive elements in one line and the inductive elements in the other line.

9. An amplifying system in accordance with claim 6, wherein said first and second propagating media comprise contiguous fluid transmission means and wherein said wave energy transmission means comprises a membranous wall separating said fluid means and is adapted to transmit waves therebetween.

10. An amplifying system in accordance with claim 6, wherein said first propagating medium comprises a first liquid stream, wherein said second propagating medium comprises a second liquid stream located contiguous to said first stream, wherein said wave energy transmission means comprises a membranous wall separating said first and second streams and is adapted to transmit waves between said streams, and wherein said means for producing motion comprises a source of hydraulic potential associated with one of said streams to force said stream to flow at said velocity relative to said other stream.

11. An amplifying system in accordance with claim 6, wherein said first and second propagating media each comprise mechanical vibration transmission systems and wherein said wave energy transmission means comprises a plurality of magnetic means located at a plurality of points along each of said systems, the magnetic means along one of said systems being located within the magnetic field of the magnetic means along the other of said systems.

12. An amplifying system comprising a first wave energy propagating medium, a second wave energy propagating medium, said second medium coupled with said first medium for mutual wave energy exchange, means for moving said second medium relative to said first medium with a constant relative velocity therebetween, said first propagating medium having a first wave propagation velocity for wave energy therein less than said relative constant velocity, said second propagating medium having a velocity of propagation for the wave energy therein substantially equal to the difference between said constant relative velocity and said propagation velocity of said first wave energy propagating medium.

13. An amplifying system comprising a first wave energy propagating medium having a measure of inertia and a measure of stiffness, a second wave energy propagating medium having a measure of inertia and a measure of stiffness, said second medium being coupled with said first medium for mutual wave energy exchange distributed over an effective length as measured along said media for said wave energy of at least several wavelengths, means for moving said second medium relative to said first medium with a constant relative velocity therebetween, said measure of inertia and said measure of stiffness of said first medium providing a wave propagation velocity for wave energy in said first medium substantially less than said relative constant velocity, said measure of inertia and measure of stiffness of said second medium providing a wave propagation velocity for wave energy therein substantially equal to the difference between said constant relative velocity and said propagation velocity of said first wave energy propagating medium.

14. An amplifying system comprising a first two-conductor electrical delay transmission line having a value of distributed inductance and capacitance, a second two-conductor electrical delay transmission line having a value of distributed inductance and capacitance, said second line being coupled with said first line for mutual wave energy exchange distributed over an effective length as measured along said lines for said wave energy of at least several wavelengths, means for moving said second line relative to said first line with a constant relative velocity therebetween, said value of inductance and said value of capacitance of said first line providing a wave propagation velocity for wave energy in said first line substantially less than said relative constant velocity, said value of inductance and said value of capacitance of said second line providing a wave propagation velocity for wave energy therein substantially equal to the difference between said constant relative velocity and said propagation velocity of said first line.

15. The method of producing signal energy amplification which comprises impressing signal energy to be amplified upon a first energy propagating medium for transmission therein in a first direction at the natural velocity of propagation of said first medium, transferring a portion of the propagated signal energy in said first medium to a second energy propagating medium to induce in said second medium a corresponding signal that is transmitted therein in a direction opposite to said first direction at the natural velocity of propagation of said second medium, developing constant relative motion between said first medium and said second medium substantially equal to the sum of the absolute natural propagation velocities of said media, whereby said signal in said first medium and said induced signal are propagated in the same direction and with substantially the same velocity relative to said first medium, and removing said propagated energy from one of said propagating media.

CASSIUS C. CUTLER.
WARREN E. MATHEWS.

REFERENCES CITED

The following references are of record in the file of this patent:

UNITED STATES PATENTS

| Number | Name | Date |
|---|---|---|
| 1,289,574 | Tedeschi | Dec. 31, 1918 |
| 1,546,440 | Fessenden | July 21, 1925 |
| 1,725,662 | Merrill | Aug. 20, 1929 |
| 2,492,138 | Earp | Dec. 27, 1949 |

OTHER REFERENCES

Publication, How the Amplidyne Functions, I Electrical World, May 1, 1943, P74 (1474).